United States Patent

Itoh et al.

[11] Patent Number: 6,146,739
[45] Date of Patent: Nov. 14, 2000

[54] GLASS RUN CHANNEL

[75] Inventors: Yuichi Itoh; Masato Karaiwa; Kyoko Kobayashi; Akira Uchiyama, all of Ichihara, Japan

[73] Assignee: Mitsui Chemicals, Inc., Tokyo, Japan

[21] Appl. No.: 09/027,178

[22] Filed: Feb. 20, 1998

[30] Foreign Application Priority Data

Feb. 21, 1997 [JP] Japan .................................. 9-037217

[51] Int. Cl.$^7$ ............................ B60J 10/04; B32B 27/08; B32B 27/32
[52] U.S. Cl. ........................... 428/122; 49/490.1; 428/517
[58] Field of Search .................................. 428/122, 516, 428/517, 519; 49/490.1; 525/232, 240, 211, 95, 96, 97, 98, 99; 524/210, 230, 266, 313, 315, 317, 318, 321, 463, 505, 526

[56] References Cited

U.S. PATENT DOCUMENTS

| 4,493,923 | 1/1985 | McCullough, Jr. ........................ 525/88 |
| 4,735,982 | 4/1988 | Orndorff, Jr. ............................ 524/269 |
| 5,110,685 | 5/1992 | Cross et al. ............................. 428/494 |
| 5,302,463 | 4/1994 | Murata et al. .......................... 428/517 |
| 5,378,543 | 1/1995 | Murata et al. .......................... 428/517 |
| 5,424,135 | 6/1995 | Murata et al. .......................... 428/517 |

FOREIGN PATENT DOCUMENTS

| 510936A2 | 10/1992 | European Pat. Off. . |
| 62-275732 | 11/1987 | Japan . |
| 2-220844 | 9/1990 | Japan . |
| 2-300250 | 12/1990 | Japan . |
| 5-004308 | 1/1993 | Japan . |
| 5-004522 | 1/1993 | Japan . |
| 5-286366 | 2/1993 | Japan . |
| 5-077363 | 3/1993 | Japan . |
| 9117900A2 | 11/1991 | WIPO . |

Primary Examiner—Ellis Robinson
Assistant Examiner—Alicia Chevalier
Attorney, Agent, or Firm—Birch, Stewart, Kolasch & Birch, LLP

[57] ABSTRACT

A glass run channel comprising a glass run channel body composed of a bottom wall and side walls extending from two opposite edges of the bottom wall, the glass run channel body having a substantially U-shaped section and provided with a groove, and tonguelike draining parts protruding from vicinities of distal edges of the side walls toward the bottom wall of the glass run channel body so as to become proximate to each other. Each of the tonguelike draining parts has a window glass contact part composed of a surface to be brought into contact with a window glass, which comprises a layer of a thermoplastic elastomer and a layer of an ultrahigh molecular weight polyolefin composition. The layer of ultrahigh molecular weight polyolefin composition is arranged so as to contact a window glass. The ultrahigh molecular weight polyolefin composition comprises at least a polyolefin (composition) having a specified intrinsic viscosity and an olefinic thermoplastic elastomer. The glass run channel is excellent in the durability, tight contactability with a window glass exhibited when the window glass is held closed and supple slide exhibited when a window glass is closed or opened and, even when twisted or bent, is free from a creasing of the ultrahigh molecular weight polyolefin composition layer.

8 Claims, 2 Drawing Sheets 3,739

GLASS RUN CHANNEL

FIELD OF THE INVENTION

The present invention relates to a glass run channel. More particularly, the present invention is concerned with a glass run channel having a window glass sliding part composed of a laminate comprising a thermoplastic elastomer substrate layer and a slide resin surface layer.

BACKGROUND OF THE INVENTION

Window glass of an automobile vehicle is generally closed or opened by vertical movement for ventilation or to talk with a vehicle outsider. A guide member known as a glass run channel is provided between a window glass and a window frame in order to enable closing or opening of the window glass in tight (liquid-tight) relationship with the window frame while facilitating the closing or opening by vertical movement of the window glass.

The conventional glass run channel is composed of a soft synthetic resin such as a soft vinyl chloride resin or a vulcanized rubber such as an ethylene/propylene/diene copolymer rubber. The glass run channel comprises a glass run channel body, this glass run channel body comprising a bottom wall and side walls extending from two opposite edges of the bottom wall, the glass run channel body having a substantially U-shaped section and provided with a groove, and tonguelike draining parts protruding from vicinities of distal edges of the side walls toward the bottom wall of the glass run channel body so as to become proximate to each other.

The conventional glass run channel has a window glass sliding part whose surface is laminated with, for example, a nylon film by bonding in order to improve the parting of the window glass from the draining part and in order to prevent fouling of the window glass. The window glass sliding part is also embossed prior to or subsequent to the lamination of the nylon film, etc. in order to reduce the area of contact with the window glass.

In the above glass run channel, a surface material such as the nylon is not adherent to the above soft synthetic resin or vulcanized rubber. Therefore, the steps are required such that the glass run channel body is formed using the soft synthetic resin or vulcanized rubber, an adhesive is applied to the formed glass run channel body and the glass run channel body is laminated with the film of, for example, nylon. Further, embossing must be carried out prior to or subsequent to the lamination. Thus, disadvantageously, the number of required steps is large and the workload is intense.

Moreover, the above glass run channel is to be produced by a process including the lamination with the use of an adhesive, so that, disadvantageously, not only is the durability thereof poor but also a peeling is likely to occur between the surface film layer and the substrate as a result of aging, outdoor exposure, etc. Further, the uneven surface pattern which can be formed by embossing is not fully satisfactory in a combination of fineness and uniformity, so that there remain points to be improved in the tight contactability of the window glass sliding part with a window glass as exhibited when the window glass is held closed and in the supple slide between the window glass sliding part and window glass as exhibited when the window glass is opened.

The inventors made extensive and intensive studies with a view toward resolving the above problems of the glass run channel; found that a glass run channel which was excellent in the durability, tight contactability with a window glass exhibited when the window glass was held closed and supple window glass slide exhibited when the window glass was opened could be fabricated with simple productive operations by selecting a thermoplastic elastomer composed of a crystalline polyolefin and a rubber as an elastomer forming at least a window glass sliding part of the glass run channel and laminating a specified ultrahigh molecular weight polyolefin composition layer onto a layer of the thermoplastic elastomer by thermal fusion bonding; and proposed a novel glass run channel (see Japanese Patent Laid-open Publication Nos. 5(1993)-4522 and 5(1993)-4308).

However, this glass run channel has encountered a problem such that the use of an ultrahigh molecular weight polyolefin such as an ultrahigh molecular weight polyethylene alone in the ultrahigh molecular weight polyolefin composition layer causes the ultrahigh molecular weight polyolefin composition layer to crease because of a high rigidity to thereby deteriorate the product appearance when the glass run channel is twisted or bent at the time of, for example, assembling the product, glass run channel, into an automobile body.

The inventors have conducted investigations with a view toward overcoming this problem. As a result, it has been found that a glass run channel capable of exhibiting the performance of ultrahigh molecular weight polyolefin, in which the ultrahigh molecular weight polyolefin composition layer is not creased when the glass run channel is twisted or bent can be obtained by employing an ultrahigh molecular weight polyolefin composition comprising an ultrahigh molecular weight polyolefin and an olefinic thermoplastic elastomer. The present invention has been completed on the basis of this finding.

OBJECT OF THE INVENTION

The present invention has been made with a view toward solving the above problems of the prior art, and the object of the present invention is to provide a glass run channel which can be produced by a simplified process and which is not only excellent in the durability, tight contactability with a window glass exhibited when the window glass is held closed, and supple window glass slide is exhibited when the window glass is opened but also, even when twisted or bent, it is free from creasing of the ultrahigh molecular weight polyolefin composition layer.

SUMMARY OF THE INVENTION

The glass run channel of the present invention comprises:
a glass run channel body, this glass run channel body comprising a bottom wall and side walls extending from two opposite edges of the bottom wall, the glass run channel body having a substantially U-shaped section and provided with a groove, and
tonguelike draining parts protruding from vicinities of distal edges of the side walls toward the bottom wall of the glass run channel body so as to become proximate to each other, the above tonguelike draining parts each having a window glass contact part composed of a surface to be brought into contact with a window glass,
wherein the above window glass contact part comprises a layer of a thermoplastic elastomer (A) composed of a crystalline polyolefin and a rubber and a layer of an ultrahigh molecular weight polyolefin composition (B),
the above layer of ultrahigh molecular weight polyolefin composition (B) arranged so as to contact with a window glass, the above ultrahigh molecular weight polyolefin composition (B) comprising:

10 to 90 parts by weight of a polyolefin (a) having an intrinsic viscosity [η] of 3.5 to 8.3 dl/g as measured in a solvent of 135° C. decalin, and 90 to 10 parts by weight of an olefinic thermoplastic elastomer (b) composed of a crystalline olefinic resin and an olefinic rubber, provided that the sum of component (a) and component (b) is 100 parts by weight.

The thermoplastic elastomer (A) for use in the present invention is preferably a thermoplastic elastomer obtained by a dynamic heating, in the presence of an organic peroxide, of a mixture comprising:

70 to 10 parts by weight of a crystalline polypropylene (A-1), and 30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight, the above rubber (A-2) being crosslinked by the dynamic heating.

An ultrahigh molecular weight polyolefin composition (B) preferably employed in the present invention comprises:

10 to 90 parts by weight of a polyolefin composition (a') having an intrinsic viscosity [η] of 3.5 to 8.3 dl/g as measured in a solvent of 135° C. decalin, said polyolefin composition (a') consisting essentially of:

an ultrahigh molecular weight polyolefin (a-1) having an intrinsic viscosity [η] of 7 to 40 dl/g as measured in a solvent of 135° C. decalin, and a polyolefin (a-2) having an intrinsic viscosity [η] of 0.1 to 5 dl/g as measured in a solvent of 135° C. decalin, the above ultrahigh molecular weight polyolefin (a-1) being present in an amount of 15 to 40% by weight based on the sum of ultrahigh molecular weight polyolefin (a-1) and polyolefin (a-2), and 90 to 10 parts by weight of an olefinic thermoplastic elastomer (b) composed of a crystalline olefinic resin and an olefinic rubber, provided that the sum of component (a') and component (b) is 100 parts by weight.

Further, in addition to the polyolefin (a) or polyolefin composition (a') and the olefinic thermoplastic elastomer (b), the ultrahigh molecular weight polyolefin composition (B) may comprise a hydrogenated or unhydrogenated block copolymer (c) comprising:

a polymer block of styrene or its derivative (c-1), and an isoprene polymer block and/or isoprene/butadiene copolymer block (c-2) having a 1,2-bonded or 3,4-bonded isoprene unit content of at least 40% based on all the isoprene units, and/or may comprise at least one member selected from the group consisting of a higher fatty acid amide (d), a silicone oil (e), an ester of an aliphatic alcohol and a dicarboxylic or monocarboxylic acid (f) and a fluoropolymer (g).

For example, it is preferred that the olefinic thermoplastic elastomer (b) forming the ultrahigh molecular weight polyolefin composition (B) be a thermoplastic elastomer obtained by a dynamic heating, in the presence of an organic peroxide, of a mixture comprising:

70 to 10 parts by weight of a crystalline polypropylene (A-1), and 30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight, the above rubber (A-2) being crosslinked by the dynamic heating. In the present invention, the thermoplastic elastomer (A) may be identical with or different from the olefinic thermoplastic elastomer (b).

The above ultrahigh molecular weight polyolefin composition (B) may contain a liquid or solid lubricating oil in an amount of 1 to 20% by weight based on the ultrahigh molecular weight polyolefin composition (B).

DETAILED DESCRIPTION OF THE INVENTION

One form of glass run channel according to the present invention will be described in detail below with reference to the appended drawings.

Figure 1:
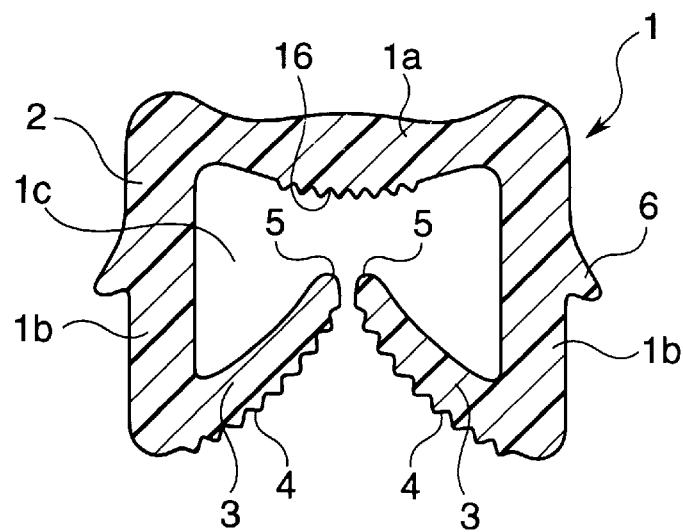
FIG. 1 is a sectional view of the glass run channel of the present invention.

FIG. 1 is a sectional view showing the sectional structure of one form of glass run channel according to the present invention.

Referring to FIG. 1, numeral 1 denotes the entire structure of a glass run channel according to the present invention. This glass run channel 1 comprises a glass run channel body 2 comprising a bottom wall 1a and side walls 1b extending from two opposite edges of the bottom wall 1a, the glass run channel body 2 having a substantially U-shaped section and provided with a groove 1c inside. Tonguelike draining parts 3,3 protrude from vicinities of distal edges of the side walls 1b, 1b toward the bottom wall 1a of the glass run channel body 2 so as to become proximate to each other. The distal edges 5,5 of the draining parts 3,3 are arranged in a position relationship such that these can mutually be closed or opened. Outer surfaces of the draining parts 3,3 are brought into contact with a window glass of a vehicle such as an automobile and form window glass contact parts 4,4. Further, in the glass run channel body 2, outer sides of the side walls 1b, 1b are fitted with mounting hooks 6,6 which protrude so as to slope toward the distal edge side of the side walls 1b, 1b.

Figure 2:
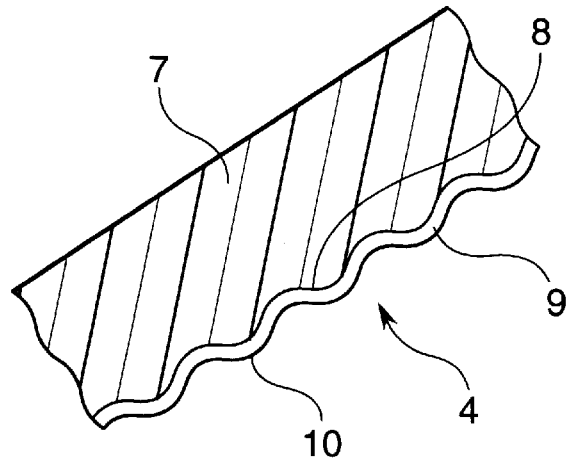
FIG. 2 is an enlarged sectional view of part of the glass run channel of FIG. 1 brought into contact with a window glass.

The glass run channel body 2 and draining parts 3,3 are integrally composed of an elastomer. In the present invention, however, at least the window glass contact parts 4,4 are each composed of a substrate layer of a specified thermoplastic elastomer (A) and a slide resin layer of a specified ultrahigh molecular weight polyolefin composition (B). It is preferred that a surface 8 of the substrate layer 7 be provided with a fine repeated uneven surface pattern as shown in FIG. 2 which exhibits an enlarged view of the window glass contact part 4. Further, it is preferred that the above slide resin layer 9 be laminated by thermal fusion bonding to the surface 8 having the fine uneven surface pattern with a shark skin appearance and that the outer surface 10 thereof be provided with a similar fine repeated uneven surface pattern.

Figure 3:
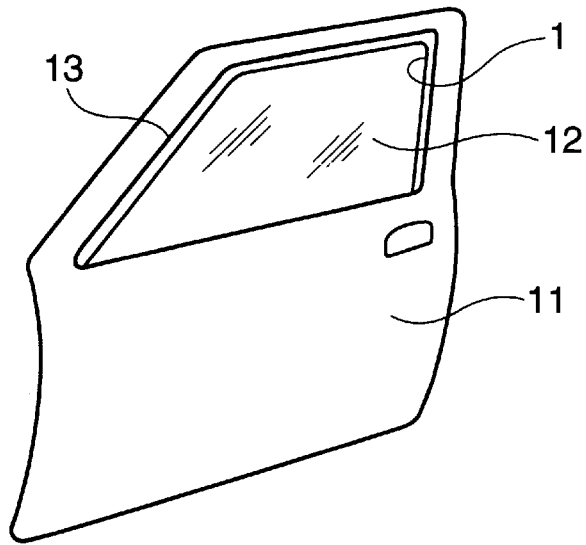
FIG. 3 is a view explaining the fitting of the glass run channel to an automobile door.
Figure 4:
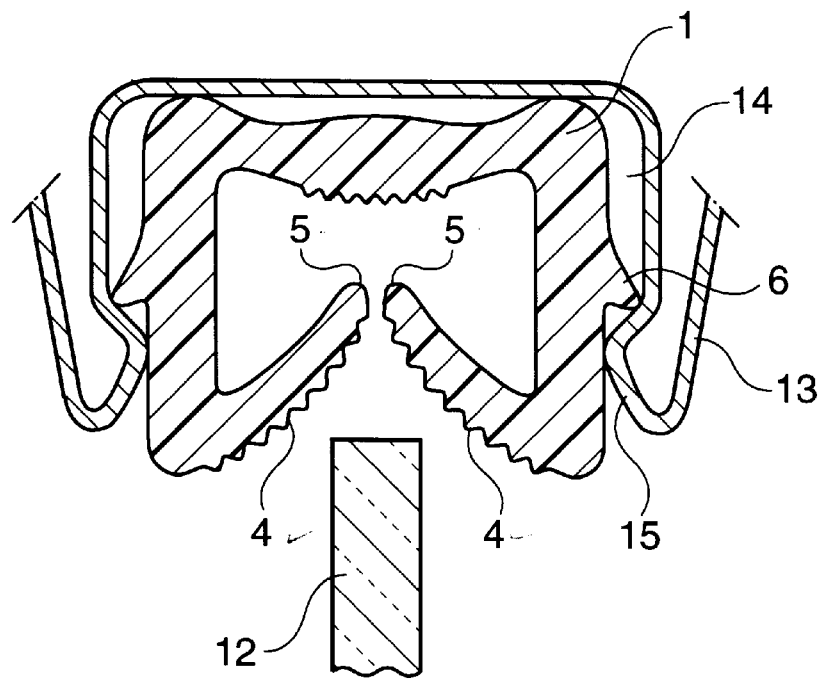
FIG. 4 is a sectional view showing the state of glass run channel exhibited when a window glass is held open.
Figure 5:
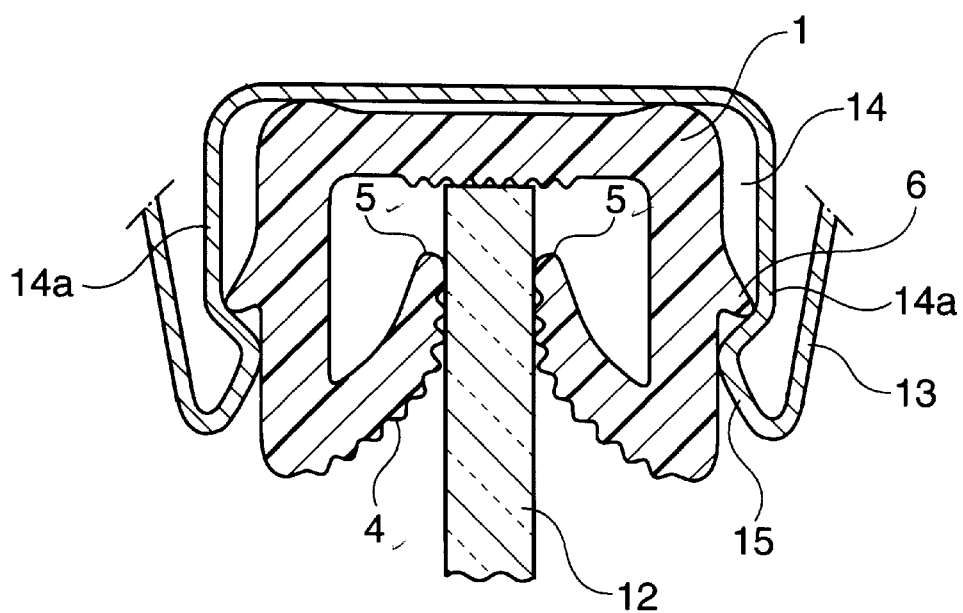
FIG. 5 is a sectional view showing the state of glass run channel exhibited when a window glass is held closed.

FIGS. 3 to 5 are a perspective view of an automobile door and sectional views of window frame parts, respectively, given for explaining the method of fitting the glass run channel of the above structure to a window frame of an automobile.

Referring to FIGS. 3 to 5, an automobile door 11 is fitted with a window glass 12 which can be closed or opened by vertical movement. On the other hand, the glass run channel 1 is fixed to an inner perimetrical part of a window frame 13 of the door 11.

For fixing the glass run channel 1 to the inner perimetrical part of the window frame 13, the entirety of the window frame 13 has a substantially U-shaped section as shown in FIGS. 4 and 5. Both side plate parts 14a forming a recess 14, at positions corresponding to the inlet of the recess 14, are provided with inward projecting protrudent parts 15. The glass run channel 1, from the bottom wall side of the glass run channel body 2, is inserted in the recess 14 of the window frame 13 so that the mounting hooks 6 go over the protrudent parts 15 of the window frame 13. As a result, the mounting hooks 6 are locked by the protrudent parts 15 to thereby prevent the glass run channel body 2 from slipping out of the recess 14 of the window frame 13. Consequently, the glass run channel 1 is fixed to the window frame 13.

Referring specifically to FIG. 4, when the window glass 12 is in a descendent state, the distal edges 5,5 of the water draining parts 3,3 forming the glass sliding parts of the glass run channel 1 face each other and are held closed to thereby enable preventing dirt from penetrating into the groove and fouling the surface of the window glass 12. On the other hand, referring to FIG. 5, when the window glass 12 is in an ascended state, the distal edges 5,5 of the water draining parts 3,3 forming the window glass sliding parts have the window glass 12 interposed therebetween and are separate from each other but are in contact with the surface of the window glass 12 to thereby ensure a liquid tightness.

In the present invention, at least part of the glass run channel 1 brought into contact with the window glass has a substrate layer 7 composed of a thermoplastic elastomer (A) and a slide resin layer 9 composed of an ultrahigh molecular weight polyolefin composition (B), the slide resin layer 9 laminated to a surface of the substrate layer 7 by thermal fusion bonding.

Illustratively, the thermoplastic elastomer (A) for use in the present invention not only can be molded by heating into an arbitrary shape and size but also is excellent in properties such as elasticity, flexibility and compressibility required for the window glass sliding part of the glass run channel and is further excellent in properties such as durability, weather resistance and water resistance. The thermoplastic elastomer (A) has strong adherence to the slide resin layer 9, as a surface material layer, composed of the ultrahigh molecular weight polyolefin composition (B), and the thermal fusion bonding thereof with the slide resin layer enables forming a laminate structure which exhibits excellent inter-layer adhesion strengths immediately after the bonding, after aging and after a weather resistance test. Moreover, the thermoplastic elastomer (A) used as the substrate layer 7 in the present invention can be molded so as to have a shark skin molding appearance. Combining this molding technique with the thermal fusion bonding of the slide resin layer 9, as a surface material layer, composed of the ultrahigh molecular weight polyolefin composition (B) to the substrate layer 7 enables faithfully reproducing a fine uneven surface pattern with a shark skin appearance on the outer surface of the slide resin layer 9. It is extremely difficult to attain the above reproduction of fine uneven surface pattern with a shark skin appearance by the conventional adhesive applying method. The above reproduction has been realized for the first time by combining the above molding technique with the thermal fusion bonding.

By virtue of the employment of the above constitution, the present invention enables omitting all of the adhesive applying step, adhesive curing or baking step and embossing step conducted prior to or after the adhesive curing or baking step and hence enables efficiently producing the glass run channel with a reduced number of steps and with a reduced workload. Moreover, the mounting of the slide resin layer 9 composed of the ultrahigh molecular weight polyolefin composition (B) as a surface material layer enables not only lowering a window glass friction coefficient but also forming a surface of a fine uneven surface pattern with shark skin appearance which is more uniformly pitched than in the conventional uneven surface pattern formed by embossing. Therefore, the glass run channel of the present invention enables a tight (liquid tight) contact with a window glass when the window glass is held closed and enables a smooth supple closing or opening movement, with the sliding resistance reduced, when the window glass is closed or opened.

Thermoplastic elastomer (A)

The thermoplastic elastomer (A) for use in the present invention is composed of a crystalline polyolefin and a rubber.

Examples of crystalline polyolefins suitably employed in the present invention include homopolymers and copolymers of α-olefins having 2 to 20 carbon atoms.

Specific examples of the above crystalline polyolefins include the following (co)polymers:

(1) ethylene homopolymer (may be produced by either of the low pressure and high pressure processes), (2) copolymers obtained by copolymerizing ethylene with up to 10 mol. % of another α-olefin or a vinyl monomer such as vinyl acetate or ethyl acrylate, (3) propylene homopolymer, (4) random copolymers obtained by copolymerizing propylene with up to 10 mol. % of another α-olefin, (5) block copolymers obtained by copolymerizing propylene with up to 30 mol. % of another α-olefin, (6) 1-butene homopolymer, (7) random copolymers obtained by copolymerizing 1-butene with up to 10 mol. % of another α-olefin, (8) 4-methyl-1-pentene homopolymer, and (9) random copolymers obtained by copolymerizing 4-methyl-1-pentene with up to 20 mol. % of another α-olefin.

The above α-olefin is, for example, ethylene, propylene, 1-butene, 4-methyl-1-pentene, 1-hexene or 1-octene.

Although the rubber for use in the present invention is not particularly limited, preferred use is made of olefinic copolymer rubbers.

The above olefinic copolymer rubbers refer to amorphous random elastic copolymers composed mainly of units derived from an α-olefin having 2 to 20 carbon atoms. Examples thereof include amorphous α-olefin copolymers prepared from a plurality of α-olefins and α-olefin/nonconjugated diene copolymers prepared from a plurality of α-olefins and a nonconjugated diene.

Specific examples of the above olefinic copolymer rubbers include:

(1) ethylene/α-olefin copolymer rubbers (molar ratio of ethylene/α-olefin: about 90/10 to 50/50), (2) ethylene/α-olefin/nonconjugated diene copolymer rubbers (molar ratio of ethylene/α-olefin: about 90/10 to 50/50), (3) propylene/α-olefin copolymer rubbers (molar ratio of propylene/α-olefin: about 90/10 to 50/50), and (4) butene/α-olefin copolymer rubbers (molar ratio of butene/α-olefin: about 90/10 to 50/50).

Examples of these α-olefins are the same as those of the α-olefins forming the crystalline polyolefin.

Examples of the above nonconjugated dienes include dicyclopentadiene, 1,4-hexadiene, cyclooctadiene, methylenenorbornene and ethylidenenorbornene.

It is preferred that these copolymer rubbers have a Mooney viscosity ($ML_{1+4}$) of 10 to 250, especially, 40 to 150 at 100° C. When the above nonconjugated diene is used in the copolymerization, the iodine value of the copolymer is preferably not greater than 25.

Although the above olefinic copolymer rubber can be in any of various crosslinking states, for example, in the state of being noncrosslinked, partially crosslinked or wholly crosslinked in the thermoplastic elastomer, it is preferred in the present invention that the olefinic copolymer rubber be in a crosslinked state, especially, in a partially crosslinked state.

The rubbers for use in the present invention are not limited to the above olefinic copolymer rubbers and include other rubbers, for example, diene rubbers such as styrene/butadiene rubber (SBR), nitrile rubber (NBR), natural rubber (NR) and butyl rubber (IIR), SEBS and polyisobutylene.

In the thermoplastic elastomer (A) for use in the present invention, the mixing ratio of a crystalline polyolefin to rubber (crystalline polyolefin/rubber) on the weight basis is generally in the range of 90/10 to 5/95, preferably, 70/30 to 10/90.

When a mixture of an olefinic copolymer rubber and another rubber is used as the rubber, the other rubber is added in an amount of up to 40 parts by weight, preferably, 5 to 20 parts by weight per 100 parts by weight of the sum of crystalline polyolefin and rubber.

A thermoplastic elastomer (A) preferably employed in the present invention is composed of a crystalline polypropylene and an ethylene/α-olefin copolymer rubber or ethylene/α-olefin/nonconjugated diene copolymer rubber, these being present in a partially crosslinked state in the thermoplastic elastomer, the mixing ratio of crystalline polypropylene to rubber (crystalline polypropylene/rubber) on the weight basis ranging from 70/30 to 10/90.

According to necessity, additives such as a mineral oil softener, a heat stabilizer, an antistatic agent, a weather stabilizer, an antioxidant, a filler, a colorant and a lubricant can be blended in the above thermoplastic elastomer (A) in an amount not detrimental to the object of the present invention.

A more specific example of thermoplastic elastomer (A) preferably employed in the present invention is a thermoplastic elastomer obtained by a dynamic heating, in the presence of an organic peroxide, of a mixture comprising:

70 to 10 parts by weight of a crystalline polypropylene (A-1), 30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight, and 5 to 100 parts by weight of a rubber (A-3) other than the rubber (A-2) and/or mineral oil softener (A-4), the above rubber (A-2) crosslinked by the dynamic heating.

Examples of suitable organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butyl perbenzoate, tert-butylperoxyisopropyl carbonate, diacetyl peroxide, lauroyl peroxide and tert-butyl cumyl peroxide.

Of these, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferred from the viewpoint of odor and scorching stability. Most especially preferred is 1,3-bis(tert-butylperoxyisopropyl)benzene.

In the present invention, the organic peroxide is used in an amount of 0.05 to 3% by weight, preferably, 0.1 to 1% by weight based on the weight of the sum of crystalline polyolefin and rubber.

In the partial crosslinking by the organic peroxide, a peroxy crosslinking auxiliary such as sulfur, p-quinone dioxime, p,p'-dibenzoylquinone dioxime, N-methyl-N-4-dinitrosoaniline, nitrosobenzene, diphenyl-guanidine or trimethylolpropane-N,N'-m-phenylenedimaleimide, divinylbenzene, triallyl cyanurate, a polyfunctional methacrylate monomer such as ethylene glycol dimethacrylate, diethylene glycol dimethacrylate, polyethylene glycol dimethacrylate, trimethylolpropane trimethacrylate or allyl methacrylate and a polyfunctional vinyl monomer such as vinyl butyrate or vinyl stearate can be added to the mixture.

A homogeneous and mild crosslinking reaction can be achieved by the use of the above compounds. In particular, divinylbenzene is especially preferred in the present invention. Divinylbenzene can be easily handled, has high compatibility with the crystalline polyolefin and rubber which are main components of the mixture to be crosslinked and has the action to solubilize the organic peroxide to thereby function as an organic peroxide dispersant, so that the crosslinking effect of heating can be homogeneous to thereby enable obtaining a thermoplastic elastomer having a good balance of fluidity and physical properties.

The above crosslinking auxiliary or polyfunctional vinyl monomer is preferably used in an amount of 0.1 to 2% by weight, still preferably, 0.3 to 1% by weight based on the total weight of the mixture to be crosslinked. When the amount of added crosslinking auxiliary or polyfunctional vinyl monomer exceeds 2% by weight, the use of a large amount of organic peroxide is accompanied by excessively rapid advance of crosslinking reaction with the result that the obtained thermoplastic elastomer has poor fluidity. On the other hand, the use of a small amount of organic peroxide is accompanied by remaining of the crosslinking auxiliary and polyfunctional vinyl monomer in the thermoplastic elastomer as unreacted monomers with the result that the thermoplastic elastomer may suffer from property changes dependent on heat history at the time of processing and molding. Therefore, the crosslinking auxiliary and polyfunctional vinyl monomer should not be added in excess.

The terminology "dynamic heating" used herein means kneading the above components in a molten state.

Various common kneading devices can be used in the kneading, which include an open mixing roll mill and a closed Banbury mixer, extruder, kneader and continuous mixer. Of these, closed kneading devices are preferred. The kneading is preferably conducted in an atmosphere of an inert gas such as nitrogen gas or carbon dioxide gas.

The kneading is preferably conducted at such a temperature that the half life of employed organic peroxide is less than 1 min. The kneading temperature generally ranges from 150 to 280° C., preferably, from 170 to 240° C. The kneading time generally ranges from 1 to 20 min, preferably, from 3 to 10 min. The applied shearing force is determined so that the shear rate is at least 100 $sec^{-1}$, preferably, in the range of 500 to 10,000 $sec^{-1}$.

The thermoplastic elastomer (A) especially preferably employed in the present invention is one partially crosslinked. The terminology "partially crosslinked" used herein means that the gel content measured by the following method is in the range of 20 to 98%. In the present invention, it is preferred that the gel content range from 40 to 98%.

[Method of measuring gel content]

About 100 mg of a sample of thermoplastic elastomer is weighed out and cut into small pieces of 0.5 mm×0.5 mm×0.5 mm. The obtained small pieces are immersed in 30 ml of cyclohexane in a closed vessel at 23° C. for 48 hr.

The immersed sample is taken out on a filter paper and tried at room temperature for 72 hr until the weight hereof becomes constant.

The weight of obtained dry residue minus the weight of cyclohexane insoluble matter other than polymer component (fibrous filler, other fillers, pigment, etc.) is referred to as "corrected final weight (Y)".

On the other hand, the weight of raw sample minus the weight of cyclohexane soluble components other than polymer component (e.g., softener) and minus the weight of cyclohexane insoluble components other than polymer component (fibrous filler, other fillers, pigment, etc.) is referred to as "corrected initial weight (X)".

The gel content (content of cyclohexane insoluble components) can be calculated by the formula:

gel content (wt. %)=[corrected final weight (Y)/corrected initial weight (X)]×100.

The thermoplastic elastomer (A) for use in the present invention comprises a crystalline polyolefin and a rubber, so that it has high fluidity.

The above thermoplastic elastomer (A) can be molded by the use of molding devices commonly employed in, for example, compression molding, transfer molding, injection molding and extrusion molding.

Ultrahigh Molecular Weight Polyolefin Composition (B)

Examples of ultrahigh molecular weight polyolefin compositions (B) suitably employed in the present invention include:

(1) composition comprising:
   a polyolefin (a) having an intrinsic viscosity [η] of 3.5 to 8.3 dl/g as measured in a solvent of 135° C. decalin, and
   an olefinic thermoplastic elastomer (b) composed of a crystalline olefinic resin and an olefinic rubber, optionally together with a hydrogenated or unhydrogenated block copolymer (c) comprising a polymer block of styrene or its derivative (c-1), and an isoprene polymer block and/or isoprene/butadiene copolymer block (c-2) having a 1,2-bonded or 3,4-bonded isoprene unit content of at least 40% based on all the isoprene units,
   and/or at least one member selected from the group consisting of a higher fatty acid amide (d), a silicone oil (e), an ester of an aliphatic alcohol and a dicarboxylic or monocarboxylic acid (f) and a fluoropolymer (g);

(2) composition comprising:
   a polyolefin composition (a') having an intrinsic viscosity [η] of 3.5 to 8.3 dl/g as measured in a solvent of 135° C. decalin, the polyolefin composition (a') consisting essentially of:
      an ultrahigh molecular weight polyolefin (a-1) having an intrinsic viscosity [η] of 7 to 40 dl/g, preferably, 10 to 35 dl/g as measured in a solvent of 135° C. decalin, and
   a low molecular weight or high molecular weight polyolefin (a-2) having an intrinsic viscosity [η] of 0.1 to 5 dl/g, preferably, 0.1 to 2 dl/g as measured in a solvent of 135° C. decalin,
      the ultrahigh molecular weight polyolefin (a-1) being present in an amount of 15 to 40% by weight, preferably, 18 to 35% by weight based on the sum of ultrahigh molecular weight polyolefin (a-1) and polyolefin (a-2),
      an olefinic thermoplastic elastomer (b) composed of a crystalline olefinic resin and an olefinic rubber, optionally together with the above block copolymer (c),
      and/or at least one member selected from the group consisting of a higher fatty acid amide (d), a silicone oil (e), an ester of an aliphatic alcohol and a dicarboxylic or monocarboxylic acid (f) and a fluoropolymer (g); and (3) composition comprising;
   ultrahigh molecular weight polyolefin composition (1) or (2) and a liquid or solid lubricating oil in an amount of 1 to 20% by weight based on the ultrahigh molecular weight polyolefin composition.

Polyolefin (a), Ultrahigh Molecular Weight Polyolefin (a-1) and Polyolefin (a-2)

Each of the polyolefin (a) forming the above composition (1) and the ultrahigh molecular weight polyolefin (a-1) and polyolefin (a-2) forming the above composition (2) is composed of a homopolymer or copolymer of an α-olefin such as ethylene, propylene, 1-butene, 1-pentene, 1-hexene, 1-octene, 1-decene, 1-dodecene, 4-methyl-1-pentene or 3-methyl-1-pentene. In the present invention, preferred use is made of ethylene homopolymer or a copolymer of ethylene and another α-olefin whose main component consists of ethylene units.

Olefinic Thermoplastic Elastomer (b)

The above olefinic thermoplastic elastomer (b) may be composed of the same material as that of the olefinic thermoplastic elastomer (A). The component (b) may be entirely identical with or different from the component (A).

Block Copolymer (c)

The block copolymer (c) for use in the present invention comprises a polymer block of styrene or its derivative (c-1) and a specified isoprene polymer block or specified isoprene/butadiene copolymer block (c-2) and may be hydrogenated.

The polymer units forming the above block (c-1) are derived from styrene or styrene derivatives.

Examples of suitable styrene derivatives include α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene and 4-(phenylbutyl)styrene. Styrene or α-methylstyrene is preferably used in the formation of polymer units of the block (c-1).

The homopolymer or copolymer forming the above block (c-2) is an isoprene polymer or isoprene/butadiene copolymer and has a 1,2-bonded and 3,4-bonded isoprene unit content of at least 40%, preferably, at least 45% based on all the isoprene units as shown below:

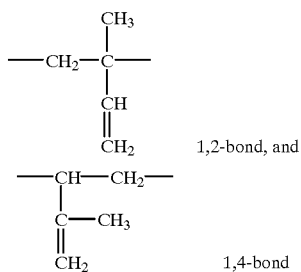

In the present invention, a thermoplastic elastomer capable of providing a molding having excellent scuffing resistance can be obtained when the 1,2-bonded and 3,4-bonded isoprene unit content based on all the isoprene units is at least 40%.

In the block copolymer (c), the content of polymer block of styrene or its derivative (c-1) preferably ranges from 5 to 50% by weight and still preferably from 10 to 45% by weight. That is, the content of isoprene polymer block or isoprene/butadiene copolymer block (c-2) preferably ranges from 95 to 50% by weight and still preferably from 90 to 55% by weight.

Hydrogenated block copolymer (c) is preferred in the present invention. A thermoplastic elastomer capable of providing a molding having excellent weather and heat resistances can be obtained by the use of the hydrogenated block copolymer (c).

The block copolymer (c) for use in the present invention exhibits a melt flow rate (MFR: measured at 230° C. under a load of 2.16 kg in accordance with ASTM D 1238, these apply hereinbelow) ranging preferably from 0.01 to 30 g/10 min and still preferably from 0.01 to 10g/10 min. A thermoplastic elastomer capable of providing a molding having excellent scuffing resistance can be obtained by the use of the block copolymer (c) whose melt flow rate is in the above range.

Although the sequence of block (c-1)/block (c-2)/block (c-1) is most suitable, the block arrangement of the block copolymer (c) for use in the present invention is not limited thereto.

The above block copolymer (c) can be produced by, for example, any of the following:

(1) process in which styrene or its derivative and isoprene or a mixture of isoprene and butadiene are sequentially polymerized in the presence of an alkyllithium compound as an initiator;

(2) process in which styrene or its derivative is polymerized, isoprene or a mixture of isoprene and butadiene is then polymerized and the resultant polymers are coupled in the presence of a coupling agent; and (3) process in which isoprene or a mixture of isoprene and butadiene and styrene or its derivative are sequentially polymerized in the presence of a dilithium compound as an initiator.

Details of a process for producing the block copolymer (c) are described in, for example, Japanese Patent Laid-open Publication No. 2(1990)-300250.

Hydrogenated block copolymer (c) can be obtained by hydrogenating the block copolymer (c) obtained by any of the above processes. The block at which hydrogenation is effected is the isoprene polymer block or isoprene/butadiene copolymer block (c-2).

In the present invention, the block copolymer (c) is used according to necessity in an amount of 5 to 60 parts by weight, preferably, 10 to 50 parts by weight and, still preferably, 10 to 40 parts by weight per 100 parts by weight of the sum of components (a), (b) and (c).

A thermoplastic elastomer capable of providing a molding which is especially excellent in wear resistance can be obtained by the use of the block copolymer (c) in the above amount.

Higher Fatty Acid Amide (d), Silicone Oil (e), Ester (f) and Fluoropolymer (g)

Examples of higher fatty acid amides (d) employed in the present invention include:

saturated fatty acid amides such as lauramide, palmitamide, stearamide and behenamide;

unsaturated fatty acid amides such as erucamide, oleamide, brassidamide and elaidamide; and bisfatty acid amides such as methylenebisstearamide, methylenebisoleamide, ethylenebisstearamide and ethylenebisoleamide. Of these, erucamide, oleamide and ethylenebisoleamide are preferred.

Examples of silicone oils (e) employed in the present invention include dimethylsilicone oil, phenylmethylsilicone oil, fluorosilicone oil, tetramethyltetraphenyltrisiloxane and modified silicone oil. Of these, dimethylsilicone oil and phenylmethylsilicone oil are preferred.

The kinematic viscosity, measured at 25° C. in accordance with Japanese Industrial Standard K 2283, of the above silicone oil (e) ranges from 10 to 30,000 cSt, preferably, from 50 to 10,000 cSt and, still preferably, from 100 to 5,000 cSt.

The ester (f) for use in the present invention is an ester of an aliphatic alcohol and a dicarboxylic or monocarboxylic acid.

Examples of such esters (f) include an ester of cetyl alcohol and acetic acid, an ester of cetyl alcohol and propionic acid, an ester of cetyl alcohol and butyric acid, an ester of beef tallow alcohol and acetic acid, an ester of beef tallow alcohol and propionic acid, an ester of beef tallow alcohol and butyric acid, an ester of stearyl alcohol and acetic acid, an ester of stearyl alcohol and propionic acid, an ester of stearyl alcohol and butyric acid, an ester of distearyl alcohol and phthalic acid, glycerol monooleate, glycerol monostearate, 12-hydroxylated stearates, glycerol tristearate, trimethylolpropane tristearate, pentaerythritol tetrastearate, butyl stearate, isobutyl stearate, stearic acid esters, oleic acid esters, behenic acid esters, calcium soap containing esters, isotridecyl stearate, cetyl palmitate, cetyl stearate, stearyl stearate, behenyl behenate, ethylene glycol montanate, glycerol montanate, pentaerythritol montanate and calcium containing montanic acid esters. Of these, an ester of distearyl alcohol and phthalic acid, glycerol monooleate, glycerol monostearate, stearic acid esters and glycerol montanate are preferred. Especially preferred are an ester of distearyl alcohol and phthalic acid, glycerol monostearate and glycerol montanate.

Examples of fluoropolymers (g) employed in the present invention include polytetrafluoroethylene and vinylidene fluoride copolymers. Of these, polytetrafluoroethylene is preferred.

In the present invention, at least one member selected from the group consisting of the above higher fatty acid amide (d), silicone oil (e), ester (f) and fluoropolymer (g) is added according to necessity in an amount of 0.01 to 10 parts by weight, preferably, 0.05 to 5 parts by weight and, still preferably, 0.1 to 5 parts by weight per 100 parts by weight of the sum of polyolefin (a) or polyolefin composition (a'), olefinic thermoplastic elastomer (b) and block copolymer (c).

The above block copolymer (c) is an optionally added component and the amount thereof can be nil.

Liquid or Solid Lubricating Oil

For example, a petroleum lubricating oil or a synthetic lubricating oil is used as the liquid lubricating oil in the above composition (3).

Examples of suitable petroleum lubricating oils include liquid paraffin, spindle oil, refrigerating machine oil, dynamo oil, turbine oil, machine oil and cylinder oil.

Examples of suitable synthetic lubricating oils include synthetic hydrocarbon oil, polyglycol oil, polyphenyl ether oil, ester oil, phosphoric ester oil, polychlorotrifluoroethylene oil, fluoroester oil, chlorinated biphenyl oil and silicone oil.

For example, graphite and molybdenum disulfide are mainly used as solid lubricating oils in the above composition (3). However, also, use can be made of boron nitride, tungsten disulfide, lead oxide, glass powder and metallic soap. The solid lubricating oil can be used either alone or in combination with the liquid lubricating oil. The solid lubricating oil can be blended in the form of, for example, powder, sol, gel or suspensoid into the ultrahigh molecular weight polyolefin.

According to necessity, additives such as a mineral oil softener, a heat stabilizer, an antistatic agent, a weather stabilizer, an antioxidant, a filler, a colorant and a lubricant can be blended in the ultrahigh molecular weight polyolefin composition (B) for use in the present invention in an amount not detrimental to the object of the present invention.

The above ultrahigh molecular weight polyolefin composition (B) (1), (2) or (3) together with the thermoplastic elastomer (A) can be molded by the coextrusion laminating molding technique. Thus, in the production of the glass run channel of the present invention, layers of the thermoplastic elastomer (A) and the ultrahigh molecular weight polyolefin composition (B) can be directly laminated to each other without passing through a film (sheet) molding step with economic advantage.

In contrast, in the use of an ultrahigh molecular weight polyolefin alone, for example, when the ultrahigh molecular weight polyolefin (a-1) having an intrinsic viscosity [η] of 7 to 40 dl/g measured in a solvent of 135° C. decalin as employed in the composition (2) is used alone, a coextrusion laminating molding with the thermoplastic elastomer (A) cannot be carried out. Thus, in the lamination of the thermoplastic elastomer and ultrahigh molecular weight polyolefin layers, at least one thereof must be formed into a film (sheet) in advance with economic disadvantage as compared with the use of the above ultrahigh molecular weight polyolefin composition (B).

In the glass run channel of the present invention, it is preferred that the draining parts 3 be composed of the same material as that of the glass run channel body 2.

When the glass run channel body 2 is composed of the thermoplastic elastomer (A), the glass run channel that can satisfactorily stand practical use from the viewpoint of durability and strength of bonding with the slide resin layer 9 can be obtained by forming the draining parts 3 from the same thermoplastic elastomer (A).

The shark skin which can be employed in the glass run channel of the present invention can be developed at the time of molding by selecting the thermoplastic elastomer (A) with appropriate properties as the raw material.

The obtained shark skin appearance is different from the melt fracture occasionally observed at the extrusion molding of resins and elastomers and exhibits periodic roughening of the skin of a molding and creation of fine irregularity.

Further, the shark skin must also be developed at the surface of the slide resin layer 9 disposed on the above shark skin, so that the slide resin layer 9 is laminated at a thickness of, generally, 3 to 50 μm. In the present invention, however, the thickness of the slide resin layer 9 can be greater or smaller than the above thickness according to necessity.

Site of the draining parts 3 at which the draining parts 3 contact the window glass 12 at the time of entry of the window glass 12 is generally different from that at which the draining parts 3 contact the window glass 12 at the time of withdrawal of the window glass 12. Therefore, it is preferred that the coating with ultrahigh molecular weight polyolefin composition (B) and the formation of shark skin executed according to necessity be effected in a relatively broad area of the draining parts 3.

In a particular example shown in FIG. 1, there is part 16 brought into contact with an edge of the window glass inside the glass run channel body 2. At this part 16 as well, the slide resin layer 9 composed of the ultrahigh molecular weight polyolefin composition (B) can be disposed on the surface of the glass run channel body 2 composed of the thermoplastic elastomer (A).

Moreover, in the present invention, the surface of the above slide resin layer 9 may be provided with a raising. Common raising decoration methods can be employed, which include (a) method in which buffing is conducted with the use of emery paper to thereby effect a raising decoration of the surface of the slide resin layer, (b) method in which card clothing rolling is conducted to thereby effect a raising decoration of the surface of the slide resin layer, (c) method in which sanding is performed with the use of, for example, a belt sander or a drum sander to thereby effect a raising decoration of the surface of the slide resin layer, and (d) method described in Japanese Patent Laid-open Publication No. 62(1987)-275,732 in which collision of hot minute substances is carried out to thereby effect a raising decoration of the surface of the slide resin layer.

EFFECT OF THE INVENTION

The present invention enables omitting all of the adhesive applying step, adhesive curing or baking step and embossing step conducted prior to or after the adhesive curing or baking step and hence enables producing the glass run channel with a reduced number of steps and with a reduced workload, thus, with economic advantages. Moreover, the present invention enables providing the glass run channel which is not only excellent in durability, but exhibits tight contactability with the window glass when the window glass is held closed and supple window glass slide when the window glass is closed or opened but also, even when twisted or bent, it is free from a creasing of the ultrahigh molecular weight polyolefin composition layer.

EXAMPLE

The present invention will now be illustrated in greater detail with reference to the following Examples, which in no way limit the scope of the invention.

Example 1

80 parts by weight of ethylene/propylene/5-ethylidene-2-norbornene copolymer rubber (hereinafter referred to as "EPDM") having an ethylene content of 70 mol %, an iodine value of 12 and a Mooney viscosity ($ML_{1+4}$) of 120 at 100° C. and 20 parts by weight of polypropylene (hereinafter referred to as "PP") exhibiting an MFR (measured at 230° C. in accordance with ASTM D 1238-65T) of 13 g/10 min and a density of 0.91 g/cm$^3$ were kneaded together by means of a Banbury mixer at 180° C. for 5 min in a nitrogen atmosphere. The obtained mixture was sheeted through rolls and cut by means of a sheet cutter into rectangular pellets.

The obtained rectangular pellets, 0.3 part by weight of 1,3-bis(tert-butylperoxyisopropyl)benzene (hereinafter referred to as "Peroxide") and 0.5 part by weight of divinylbenzene (hereinafter referred to as "DVB") ) were agitated and mixed together by means of a Henschel mixer.

The resultant mixture was extruded by means of a twin-screw extruder (L/D=40, screw diameter: 50 mm) at 220° C. in a nitrogen atmosphere, thereby obtaining thermoplastic elastomer (A-1).

The gel content of the thermoplastic elastomer (A-1) was measured by the method described hereinbefore, and it was found that the gel content was 85% by weight.

This thermoplastic elastomer (A-1) was extrusion molded at 230° C. to form a glass run channel body and draining parts. An ultrahigh molecular weight polyethylene composition (B-1) obtained by kneading 75 parts by weight of polyethylene composition (a') having an intrinsic viscosity [η] of 7.0 dl/g as measured in a solvent of 135° C. decalin, the polyethylene composition (a') consisting of 23% by weight of ultrahigh molecular weight polyethylene (a-1) having an intrinsic viscosity [η] of 28 dl/g as measured in a solvent of 135° C. decalin and 77% by weight of low molecular weight polyethylene (a-2) having an intrinsic viscosity [η] of 0.73 dl/g as measured in a solvent of 135° C. decalin, and 25 parts by weight of thermoplastic elastomer (A-1) by means of the above twin-screw extruder was laminated at 250° C. by the coextrusion laminating technique to the surface of the draining parts. Thus, a glass run channel was obtained.

The obtained glass run channel had a substantially trapezoidal shape. Referring to FIG. 3, the glass run channel 1 fixed to a window frame 13 had a total length of sloped and horizontal parts of 1500 mm and a vertical part length of 900 mm. Referring to FIG. 1, the glass run channel body 2 had an outer width of bottom part of 15 mm, an outer height of side part of 20 mm and a length of draining part 3 of 10 mm. The shape of section of the glass run channel body 2 was substantially the same as shown in FIG. 1. The average thickness of the ultrahigh molecular weight polyethylene composition layer was 30 μm.

The obtained glass run channel was secured to a test window frame, and a window glass having a thickness of 3.2 mm was fitted thereto. A durability test in which the raising and lowering of the window glass was repeated was carried out. As a result, it was found that this glass run channel stood 50,000 repetitions of the raising and lowering of the window glass and maintained the function of glass run channel.

By contrast, the conventional glass run channel (the window glass sliding part had a laminate structure comprising a nylon film bonded to a soft vinyl chloride resin layer) suffered from breakage at the window glass contacting surface when the raising and lowering of the window glass was repeated 25,000 times. Thereafter, the frictional resistance with the window glass extremely increased to thereby disenable further use of the glass run channel.

A straight line part of the glass run channel obtained in this Example 1 was cut into a length of 30 cm and 180° bent at the middle thereof with the draining parts arranged outside. Irrespective of this bending, the ultrahigh molecular weight polyethylene composition layer (slide resin layer) had no significant crease observed.

Example 2

The same procedure as in Example 1 was repeated except that use was made of ultrahigh molecular weight polyethylene composition (B-2) obtained by kneading 60 parts by weight of polyethylene composition (a'), 15 parts by weight of thermoplastic elastomer (A-1) and styrene/isoprene/styrene block copolymer (styrene content: 25 parts by weight, 1,2-bonded and 3,4-bonded isoprene unit content of isoprene polymer portion: 55%, and melt flow rate: 2.5 g/10 min) (c) by means of the above twin-screw extruder.

The obtained glass run channel was subjected to the same window glass raising and lowering repeating test as in Example 1. The glass run channel stood 50,000 repetitions. Irrespective of the above bending, the ultrahigh molecular weight polyethylene composition layer had no significant crease observed.

Example 3

The same procedure as in Example 1 was repeated except that the thermoplastic elastomer (A-2) was produced by adding not only EPDM and PP but also 10 parts by weight of butyl rubber [IIR-065 produced by Esso, degree of unsaturation: 0.8 mol %, hereinafter referred to as "IIR"] and 30 parts by weight of paraffinic process oil (trade name: Diana Process Oil, produced by Idemitsu Kosan Co., Ltd.). The obtained thermoplastic elastomer (A-2) had a gel content of 70%.

The obtained glass run channel stood 50,000 repetitions of the raising and lowering of the window glass. Irrespective of the above bending, the ultrahigh molecular weight polyethylene composition layer had no significant crease observed.

Example 4

The same procedure as in Example 1 was repeated except that the ultrahigh molecular weight polyethylene composition (B-3) was produced by adding not only 75 parts by weight of polyethylene composition (a') and 25 parts by weight of thermoplastic elastomer (A-1) but also 0.5 part by weight of erucamide.

The obtained glass run channel stood 50,000 repetitions of the raising and lowering of the window glass. Irrespective of the above bending, the ultrahigh molecular weight polyethylene composition layer had no significant crease observed.

Comparative Example 1

The same procedure as in Example 1 was repeated except that the polyethylene composition (a') was used alone in place of the ultrahigh molecular weight polyethylene composition (B-1).

The obtained glass run channel stood 50,000 repetitions of the raising and lowering of the window glass. However, upon the above bending, a creasing and whitening was observed at the part of the ultrahigh molecular weight polyethylene composition layer.

What is claimed is:

1. A glass run channel comprising:
    a glass run channel body, said glass run channel body comprising a bottom wall and side walls extending from two opposite edges of the bottom wall, said glass run channel body having a substantially U-shaped section and provided with a groove, and
    tongue-shaped draining parts protruding from vicinities of distal edges of the side walls toward the bottom wall of the glass run channel body so as to become proximate to each other, said tongue-shaped draining parts each having a window glass contact part composed of a surface to be brought into contact with a window glass,
    wherein said window glass contact part comprises a layer of a thermoplastic elastomer (A) composed of a crystalline polyolefin and a rubber and a layer of an ultrahigh molecular weight polyolefin composition (B),
    said layer of ultrahigh molecular weight polyolefin composition (B) arranged so as to contact with a window glass,
    said ultrahigh molecular weight polyolefin composition (B) comprising:
        10 to 90 parts by weight of a polyolefin composition (a') having an intrinsic viscosity $[\eta]$ of 3.5 to 8.3 dl/g as measured in a solvent of 135° C. decalin, said polyolefin composition (a') consisting essentially of:
            an ultrahigh molecular weight polyolefin (a-1) having an intrinsic viscosity $[\eta]$ of 7 to 40 dl/g as measured in a solvent of 135° C. decalin, and
            a polyolefin (a-2) having an intrinsic viscosity $[\eta]$ of 0.1 to 5 dl/g as measured in a solvent of 135° C. decalin,
            said ultrahigh molecular weight polyolefin (a-1) being present in an amount of 15 to 40% by weight based on the sum of ultrahigh molecular weight polyolefin (a-1) and polyolefin (a-2), and
        10 to 90 parts by weight of an olefinic thermoplastic elastomer (b) composed of a crystalline olefinic resin and an olefinic rubber, provided that the sum of component (a') and component (b) is 100 parts by weight.

2. The glass run channel as claimed in claim 1, wherein the thermoplastic elastomer (A) is a thermoplastic elastomer obtained by a dynamic heating, in the presence of an organic peroxide, of a mixture comprising:
    70 to 10 parts by weight of a crystalline polypropylene (A-1), and
    30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight,
    said rubber (A-2) being crosslinked by the dynamic heating.

3. The glass run channel as claimed in claim 1, wherein the ultrahigh molecular weight polyolefin composition (B) comprises:
    10 to 90 parts by weight of a polyolefin composition (a') having an intrinsic viscosity $[\eta]$ of 3.5 to 8.3 dl/g as measured in a solvent of 135° C. decalin, said polyolefin composition (a') consisting essentially of:
        an ultrahigh molecular weight polyolefin (a-1) having an intrinsic viscosity $[\eta]$ of 7 to 40 dl/g as measured in a solvent of 135° C. decalin, and
        a polyolefin (a-2) having an intrinsic viscosity $[\eta]$ of 0.1 to 5 dl/g as measured in a solvent of 135° C. decalin,
        said ultrahigh molecular weight polyolefin (a-1) being present in an amount of 15 to 40% by weight based on the sum of ultrahigh molecular weight polyolefin (a-1) and polyolefin (a-2),
    85 to 5 parts by weight of an olefinic thermoplastic elastomer (b) composed of a crystalline olefinic resin and an olefinic rubber, and
    5 to 60 parts by weight of a hydrogenated or unhydrogenated block copolymer (c) comprising:
        a polymer block of styrene or its derivative (c-1), and
        an isoprene polymer block and/or isoprene/butadiene copolymer block (c-2) having a 1,2-bonded or 3,4-bonded isoprene unit content of at least 40% based on all the isoprene units,
        provided that the sum of component (a'), component (b) and component (c) is 100 parts by weight.

4. The glass run channel as claimed in any one of claims 1 or 3, wherein the ultrahigh molecular weight polyolefin composition (B) further comprises at least one member selected from the group consisting of a higher fatty acid amide (d), a silicone oil (e), an ester of an aliphatic alcohol and a dicarboxylic or monocarboxylic acid (f) and a fluoropolymer (g), said member contained in an amount of 0.01 to 10 parts by weight per 100 parts by weight of the ultrahigh molecular weight polyolefin composition (B).

5. The glass run channel as claimed in claim 1, wherein the olefinic thermoplastic elastomer (b) forming the ultrahigh molecular weight polyolefin composition (B) is a thermoplastic elastomer obtained by a dynamic heating, in the presence of an organic peroxide, of a mixture comprising:
    70 to 10 parts by weight of a crystalline polypropylene (A-1), and
    30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight,
    said rubber (A-2) being crosslinked by the dynamic heating.

6. The glass run channel as claimed in claim 1, wherein the ultrahigh molecular weight polyolefin composition (B) contains a liquid or solid lubricating oil in an amount of 1 to 20% by weight based on the ultrahigh molecular weight polyolefin composition (B).

7. The glass run channel as claimed in claim 1, wherein the olefinic thermoplastic elastomer (b) forming the ultrahigh molecular weight polyolefin composition (B) is a thermoplastic elastomer obtained by a dynamic heating, in the presence of an organic peroxide, of a mixture comprising:
    70 to 10 parts by weight of a crystalline polypropylene (A-1), and 30 to 90 parts by weight of a rubber (A-2) composed of an ethylene/propylene copolymer rubber or an ethylene/propylene/diene copolymer rubber, provided that the sum of component (A-1) and component (A-2) is 100 parts by weight, said rubber (A-2) being crosslinked by the dynamic heating.

8. The glass run channel as claimed in claim 5, wherein the ultrahigh molecular weight polyolefin composition (B) contains a liquid or solid lubricating oil in an amount of 1 to 20- by weight based on the ultrahigh molecular weight polyolefin composition (B).

* * * * *